(12) United States Patent
Hu et al.

(10) Patent No.: US 7,317,502 B2
(45) Date of Patent: Jan. 8, 2008

(54) LIQUID CRYSTAL PANEL WITH IMPROVED CHROMATICITY AND BRIGHTNESS

(75) Inventors: Chih-Jen Hu, Jhongli (TW); Chih-Ming Chang, Jhongli (TW)

(73) Assignee: AU Optronics Corp., Hsinchu (TW)

( * ) Notice: Subject to any disclaimer, the term of this patent is extended or adjusted under 35 U.S.C. 154(b) by 246 days.

(21) Appl. No.: 10/921,655

(22) Filed: Aug. 19, 2004

(65) Prior Publication Data
US 2005/0237450 A1 Oct. 27, 2005

(30) Foreign Application Priority Data
Apr. 27, 2004 (TW) .............................. 93111695 A

(51) Int. Cl.
*G02F 1/1335* (2006.01)
(52) U.S. Cl. ...................... 349/114; 349/144
(58) Field of Classification Search ............... 349/114, 349/106, 144
See application file for complete search history.

(56) References Cited

U.S. PATENT DOCUMENTS

| 5,153,756 | A | * | 10/1992 | Ike ............................. 349/116 |
| 5,154,756 | A | * | 10/1992 | Nakajima et al. .............. 75/538 |
| 5,608,422 | A | * | 3/1997 | Ikeda ........................ 345/101 |
| 6,888,604 | B2 | * | 5/2005 | Rho et al. .................... 349/146 |
| 2002/0054256 | A1 | * | 5/2002 | Kim et al. ................... 349/113 |
| 2004/0046725 | A1 | | 3/2004 | Lee ............................. 345/88 |
| 2004/0051724 | A1 | | 3/2004 | Elliott et al. ................ 345/694 |

FOREIGN PATENT DOCUMENTS

| CN | 1353548 | 6/2002 |
| CN | 1360220 | 7/2002 |
| JP | 2001306023 | 11/2001 |
| JP | 2003255379 | 9/2003 |

OTHER PUBLICATIONS

China Office Action mailed Aug. 11, 2006.
TW Office Action mailed May 22, 2007.

* cited by examiner

*Primary Examiner*—Andrew Schechter
*Assistant Examiner*—Phu Vu
(74) *Attorney, Agent, or Firm*—Thomas, Kayden, Horstemeyer & Risley

(57) ABSTRACT

A liquid crystal panel comprising a plurality of pixels arranged in a matrix. Each pixel comprises a red sub-pixel, a green sub-pixel, a blue sub-pixel, and an auxiliary sub-pixel with a transflective area.

11 Claims, 7 Drawing Sheets

LIQUID CRYSTAL PANEL WITH IMPROVED CHROMATICITY AND BRIGHTNESS

BACKGROUND

The present invention relates in general to a liquid crystal display (LCD), and more particularly, to a liquid crystal panel with improved color and brightness.

Due to the characteristics of thin profile and low power consumption, liquid crystal displays (LCDs) are widely employed in electronic products, such as portable personal computers, digital cameras, projectors, and the like. Generally, LCD devices are classified into transmissive, reflective, and transflective types. The transmissive LCD employs a backlight module as the light source. The reflective LCD employs the ambient light as the light source. The transflective LCD employs the backlight module or the ambient light as the light source.

FIG. 1 illustrates a pixel structure in a conventional liquid crystal panel and FIG. 2 is a cross-section along line 2-2 line shown in FIG. 1. The pixel structure 101 of the liquid crystal panel comprises a red sub-pixel 101R, a green sub-pixel 101G, and a blue sub-pixel 101B. Each sub-pixel comprises a lower substrate 100, a device layer 104, a liquid crystal layer 106, a color filter 103, 105, or 107, and an upper substrate 102. The device layer 104 is disposed on the lower substrate 100, which may comprise gate lines, data lines, transistors, passivation layers, and pixel electrodes. In order to simplify the diagram, only a flat layer is depicted. The upper substrate 102 is disposed opposite to the lower substrate 100. The color filters 103, 105, and 107 are disposed on the upper substrate 102 and face the lower substrate 100. The color filters 103, 105, and 107 respectively correspond to the red sub-pixel 101R, the green sub-pixel 101G, and the blue sub-pixel 101B. The liquid crystal layer 106 is disposed between the device layer 104 and the color filters 103, 105, and 107.

In order to meet the high chromaticity requirement for transmissive or reflective liquid crystal panels, the thickness of the color filter or the concentration of the pigment in the color filters must be increased. As a result, transmittance of the transmissive liquid crystal panel or reflectivity of the reflective liquid crystal panel is reduced, resulting in lower brightness. Additionally, for the transflective liquid crystal panel, since the light must pass through the color filter twice in reflective mode, higher chromaticity is obtained than transmissive mode. Moreover, brightness of the transflective liquid crystal panel may be reduced. Brightness of the transflective liquid crystal panel can be improved by increasing the area of the reflective area therein. It is useless, however, to reduce chromaticity in reflective mode. That is, the color balance-problem still exists.

Since liquid crystal display technology has gradually replaced conventional cathode ray tube (CRT) technology, new pixel structures are required to improve color and brightness of liquid crystal panels to increase display quality.

SUMMARY

An embodiment of the invention provides a liquid crystal panel. The panel comprises a plurality of pixels arranged in a matrix. Each pixel comprises a red sub-pixel, a green sub-pixel, a blue sub-pixel, and an auxiliary sub-pixel with a transflective, transmissive, or reflective area. The auxiliary sub-pixel comprises a white, yellow, or green color filter, or a dual-color filter, such as a white/green or white/yellow color filter. The red, green, and blue sub-pixels have a transflective, transmissive, or reflective area. The red, green, blue, and auxiliary sub-pixels are arranged in a strip or mosaic.

An embodiment of the invention additionally provides a liquid crystal display. The display comprises a liquid crystal panel, a light detector, a contrast calculating device, a color controlling device, and a liquid crystal panel driver. The liquid crystal panel comprises a plurality of pixels arranged in a matrix. Each pixel comprises a red sub-pixel, a green sub-pixel, a blue sub-pixel, and an auxiliary sub-pixel with a transflective, transmissive, or reflective area. The light detector outputs a detection signal after detecting brightness of ambient light. The contrast calculating device calculates contrast of the liquid crystal panel according to the detection signal and outputs a first contrast adjusting signal. The color controlling device transfers a color image signal according to the first contrast adjusting signal. The liquid crystal panel driver receives the transferred color image signal and outputs a driving signal to drive the liquid crystal panel. Moreover, the display further comprises a manual controlling device and a switching device. The manual controlling device outputs a second contrast adjusting signal. The switching device receives the first and second contrast adjusting signals and outputs one of the signals to the color controlling device, thereby transferring the color image signal. Moreover, the red, green, and blue sub-pixels have a transflective, transmissive, or reflective area. Furthermore, the red, green, blue, and auxiliary sub-pixels are arranged in a strip or mosaic.

BRIEF DESCRIPTION OF THE DRAWINGS

Embodiments of the invention will become more fully understood from the detailed description given hereinbelow and the accompanying drawings given by way of illustration only and thus not intended to be limitative of the invention.

DETAILED DESCRIPTION

Figure 1:
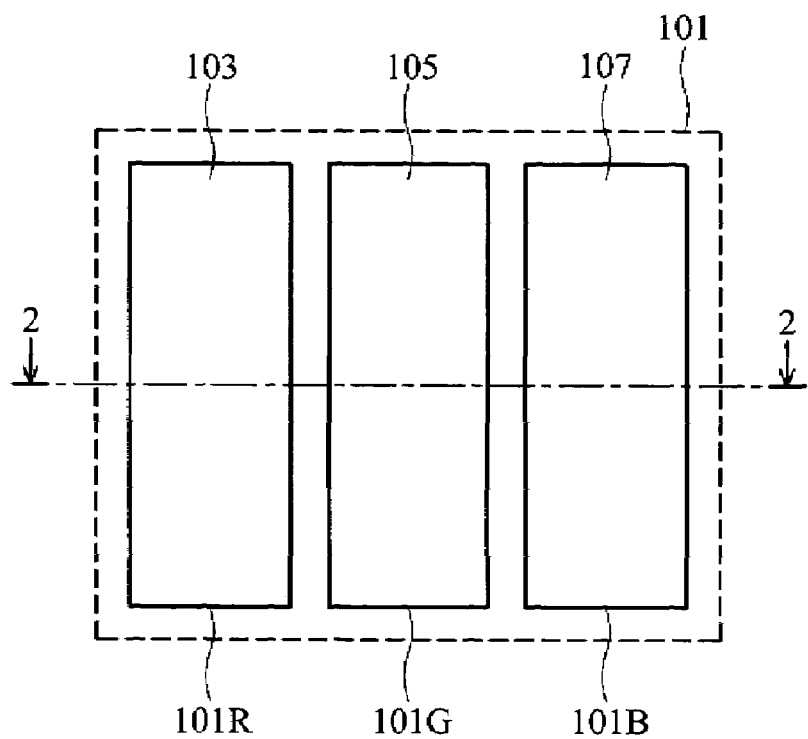
FIG. 1 is a top view of a pixel structure in a conventional liquid crystal panel.
Figure 2:
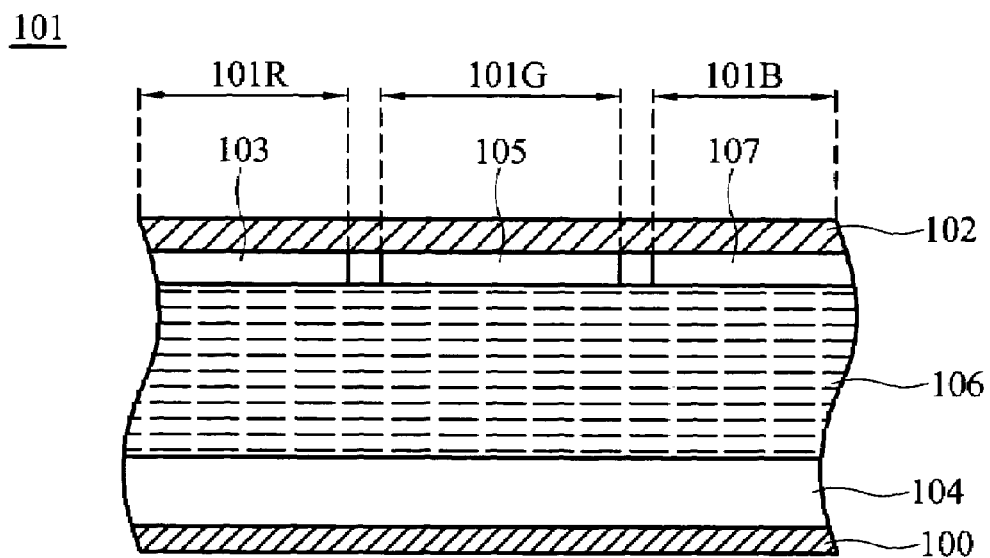
FIG. 2 is a cross-section along line 2-2 shown in FIG. 1.
Figure 3:
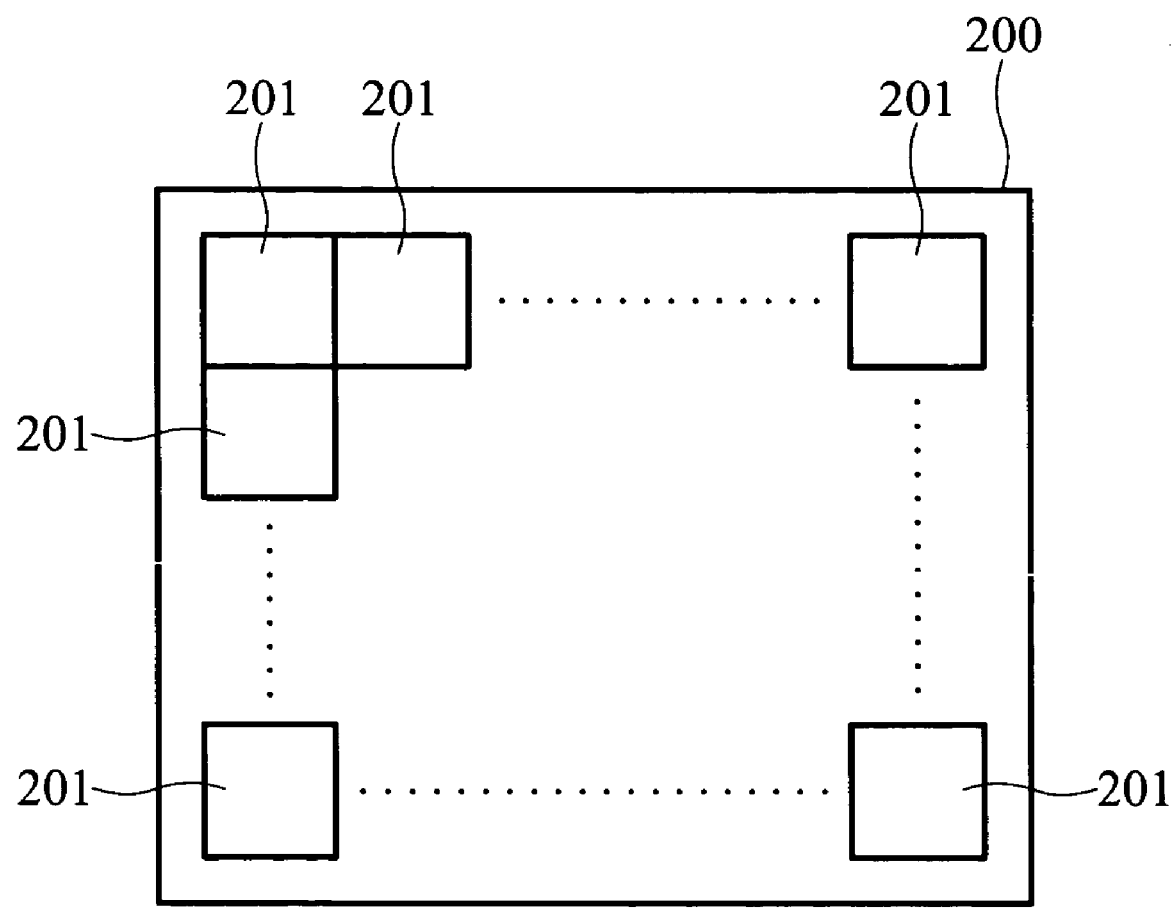
FIG. 3 is a top view of a liquid crystal panel of an embodiment of the invention.
Figure 4A:
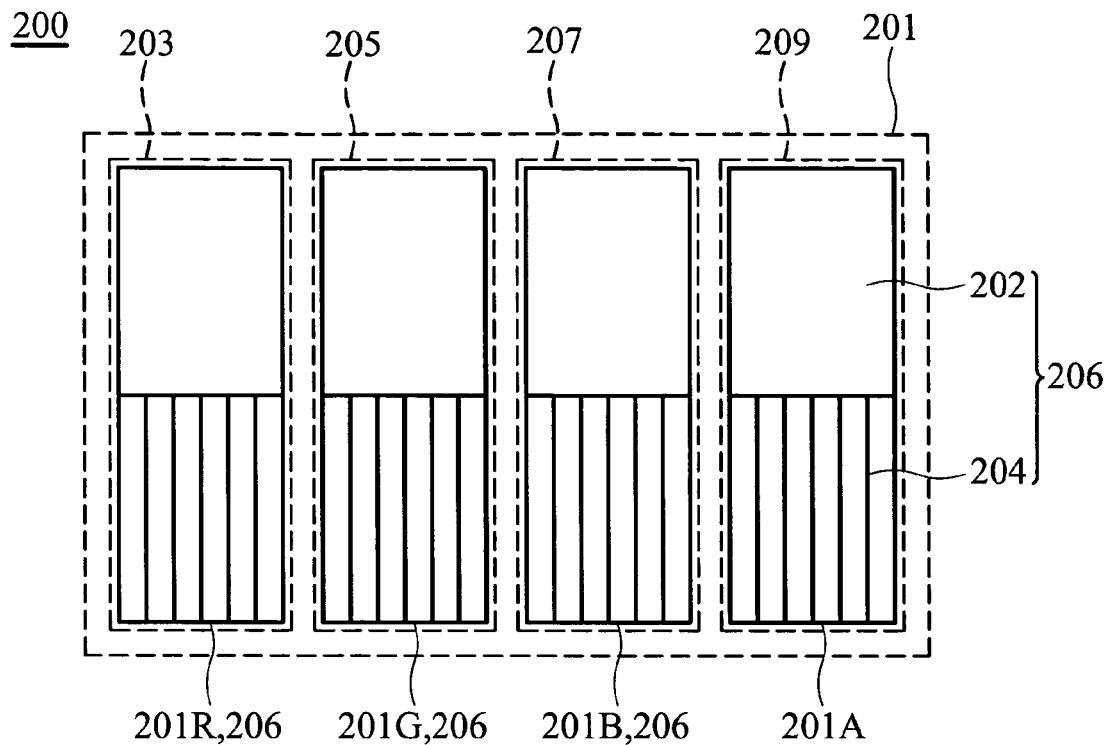
FIG. 4A is a top view of a pixel in a transflective liquid crystal panel of an embodiment of the invention.

Referring to FIGS. 3 and 4A, FIG. 3 illustrates a liquid crystal panel of an embodiment of the invention and FIG. 4A illustrates a pixel in a transflective liquid crystal panel of an embodiment of the invention. In FIG. 3, the liquid crystal panel 200 comprises a plurality of pixels 201 arranged in a matrix. Here, in order to simplify the diagram, each pixel 201 is depicted as a blank block.

Next, in FIG. 4A, each pixel 201 comprises a red sub-pixel 201R, a green sub-pixel 201G, a blue sub-pixel 201B, and an auxiliary sub-pixel 201A. Moreover, sub-pixels are arranged in a strip.

In this embodiment, the auxiliary sub-pixel 201A has a transflective area 206 which comprises a transmissive area 202 and a reflective area 204. Moreover, for example, the red, green, and blue sub-pixels 201R, 201G, and 201B also have the transflective area 206. Each sub-pixel comprises a color filter used for displaying different primary colors. For example, the red, green, and blue sub-pixels 201R, 201G, and 201B comprise a red color filter 203, a green color filter 205, and a blue color filter 207, respectively. Moreover, the auxiliary sub-pixel 201A comprises an auxiliary color filter 209. The transmittance of the auxiliary color filter 209 must be higher than that of the red or blue color filter, thereby increasing the brightness of the pixel 201. For example, the auxiliary color filter 209 can be a white color (achromatic or transparent) filter, a yellow color filter, or a green color filter.

Figure 4B:
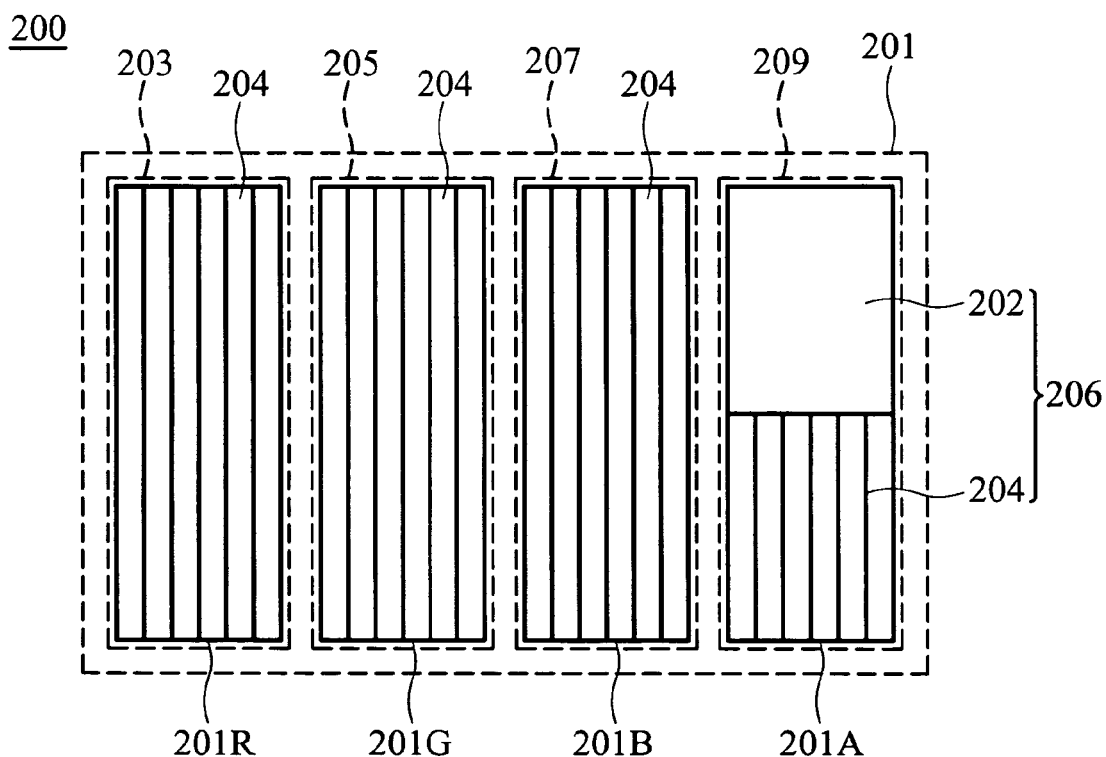
FIG. 4B is a top view of a pixel in a reflective liquid crystal panel of an embodiment of the invention.

FIG. 4B illustrates a pixel in a reflective liquid crystal panel of an embodiment of the invention, in which the same reference numbers as FIG. 4A are used in FIG. 4B. A pixel 201 of the reflective type liquid crystal panel 200 also comprises a red sub-pixel 201R, a green sub-pixel 201G, a blue sub-pixel 201B, and an auxiliary sub-pixel 201A. The sub-pixels are arranged in a strip.

In FIG. 4B, auxiliary sub-pixel 201A has a transflective area 206 which comprises a transmissive area 202 and a reflective area 204. Moreover, the red, green, and blue sub-pixels 201R, 201G, and 201B, for example, comprise reflective area 204. Each sub-pixel comprises a color filter used for displaying different primary colors. For example, the red, green, and blue sub-pixels 201R, 201G, and 201B comprise a red color filter 203, a green color filter 205, and a blue color filter 207, respectively. The auxiliary sub-pixel 201A comprises an auxiliary color filter 209. The auxiliary color filter 209 can be, for example, a white color (achromatic or transparent) filter, a yellow color filter, or a green color filter.

Figure 4C:
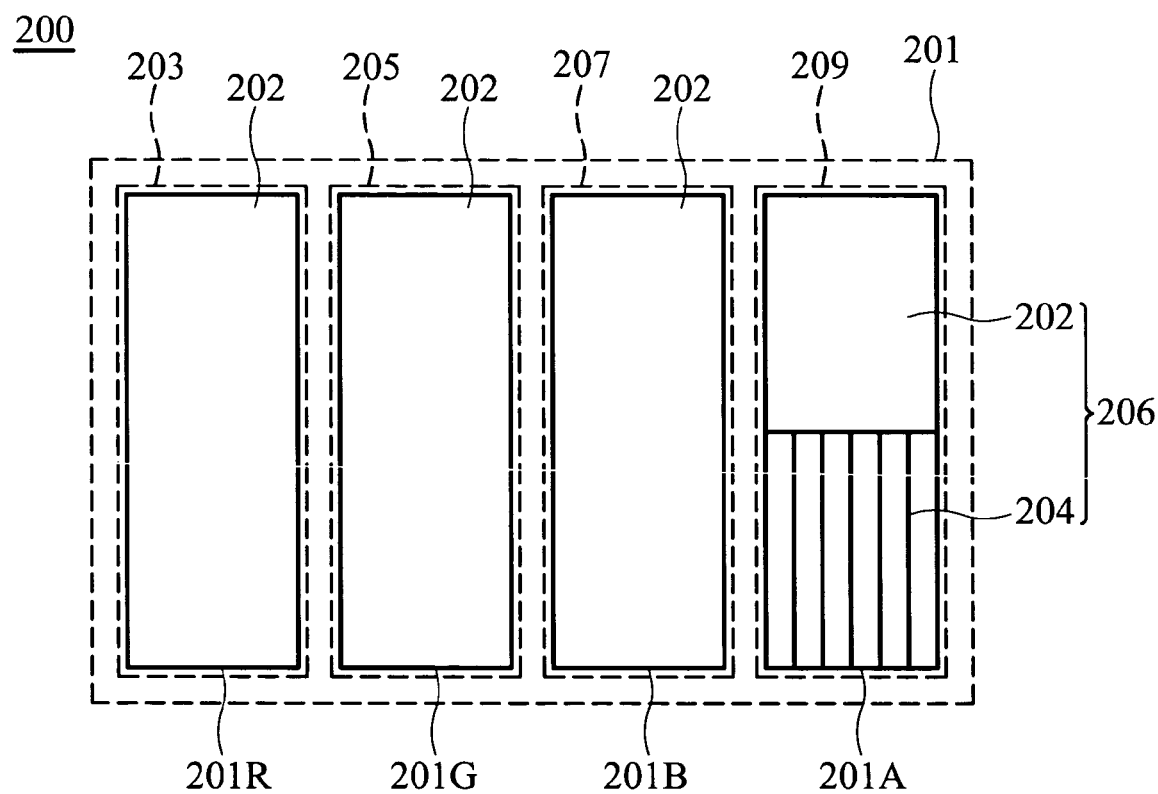
FIG. 4C is a top view of a pixel in a transmissive liquid crystal panel of an embodiment of the invention.

FIG. 4C illustrates a pixel in a transmissive liquid crystal panel of an embodiment of the invention, in which the same reference numbers as FIG. 4A are used in FIG. 4C. A pixel 201 of the transmissive liquid crystal panel 200 also comprises a red sub-pixel 201R, a green sub-pixel 201G, a blue sub-pixel 201B, and an auxiliary sub-pixel 201A. The sub-pixels are arranged in a strip.

In FIG. 4C, auxiliary sub-pixel 201A has a transflective area 206 which comprises a transmissive area 202 and a reflective area 204. The red, green, and blue sub-pixels 201R, 201G, and 201B; for example, comprise transmissive area 202. Each sub-pixel comprises a color filter used for displaying different primary colors. For example, the red, green, and blue sub-pixels 201R, 201G, and 201B comprise a red color filter 203, a green color filter 205, and a blue color filter 207, respectively. Moreover, the auxiliary sub-pixel 201A comprises an auxiliary color filter 209. For example, the auxiliary color filter 209 can be a white color (achromatic or transparent) filter, a yellow color filter, or a green color filter.

When the liquid crystal panel is fabricated, chromaticity and brightness of pixels 201 can be adjusted by controlling the area ratio between the transmissive area 202 and the reflective area 204 in the auxiliary sub-pixel 201A. Here, employing the white color filter achieves two aims. One is to adjust color of the panel by mixture of white light. The second is to increase brightness through high transmittance (or low absorptance) of the white color filter. Additionally, since the naked eye is more sensitive to yellow or green color in a high brightness environment, higher color saturation of yellow or green color is required. Therefore, a yellow or green color filter can be employed. Moreover, since white, yellow, or green color filters have a higher transmittance than blue or red color filters, they are useful for improving brightness.

Figure 5:
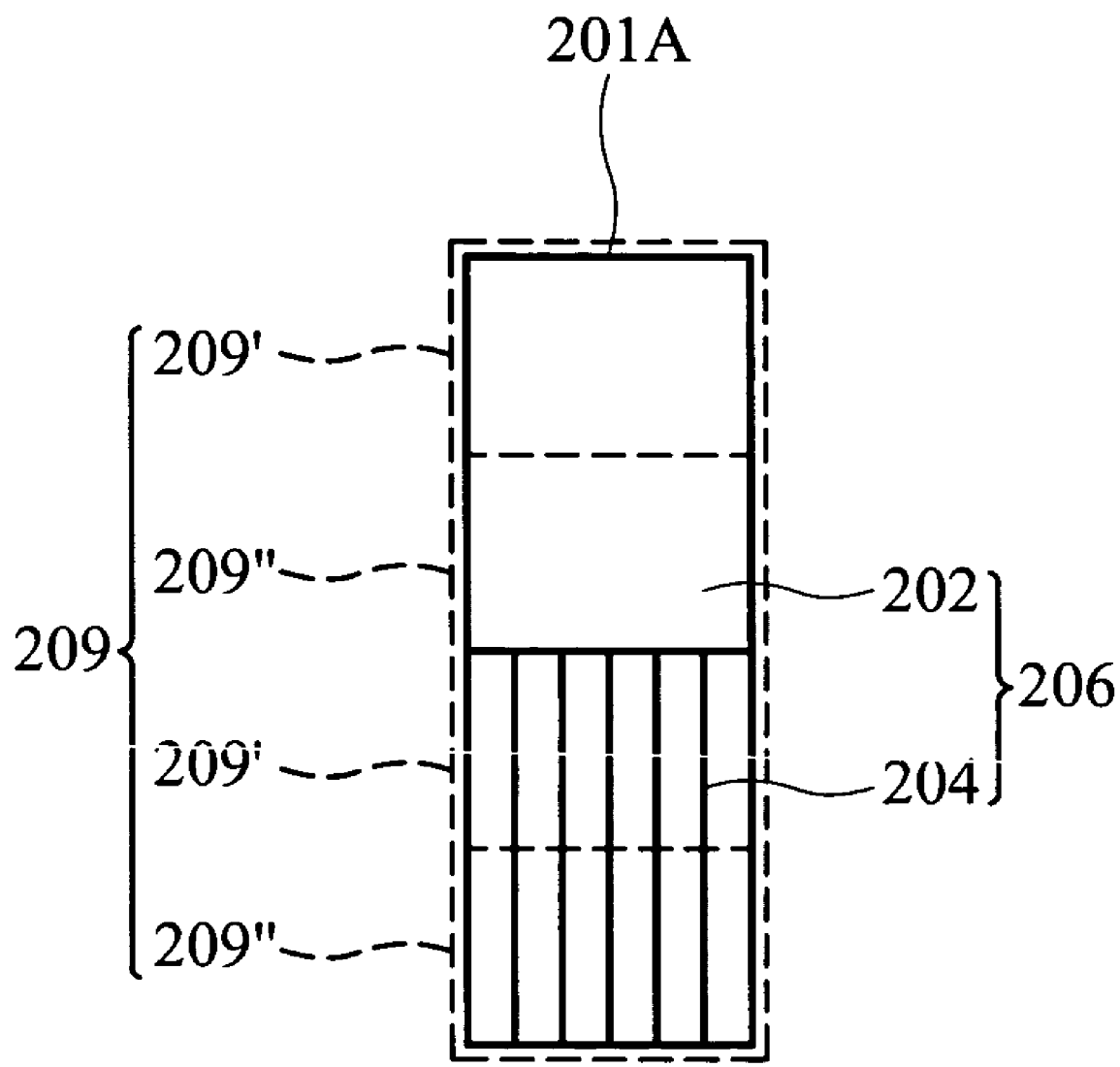
FIG. 5 is a top view of an auxiliary sub-pixel with a dual-color filter of an embodiment of the invention.

The auxiliary color filter 209 can be a single color filter or a dual-color filter. FIG. 5 illustrates an auxiliary sub-pixel with a dual-color filter of an embodiment of the invention, in which the same reference numbers as FIG. 4A are used in FIG. 5. The auxiliary color filter 209 comprises at least one white color portion 209' and at least one yellow or green color portion 209". For example, the transmissive area 202 of the auxiliary sub-pixel 201A comprises white color portion 209' and yellow or green color portion 209". The reflective area 204 of the auxiliary sub-pixel 201A also comprises white color portion 209' and yellow or green color portion 209". In embodiments of the invention, the transmissive, reflective, or transflective liquid crystal panel 200 can employ the auxiliary dual-color filter 209 to improve brightness and chromaticity. For the auxiliary dual-color filter 209, the white color portion 209' is employed to adjust chromaticity of the panel 200 by the mixture of light mixture. Moreover, the yellow or green color portion 209" is employed to compensate for yellow or green color saturation. In the embodiment shown in FIG. 5, the transmissive area 202 of the auxiliary sub-pixel 201A has a white color portion 209' and a yellow or green color portion 209" as well as the reflective area 204. The transmissive area 202 and the reflective area 204 of the auxiliary sub-pixel 201A, however, can comprise a plurality of white color portions 209' and a plurality of yellow or green color portions 209", respectively.

Figure 6A:
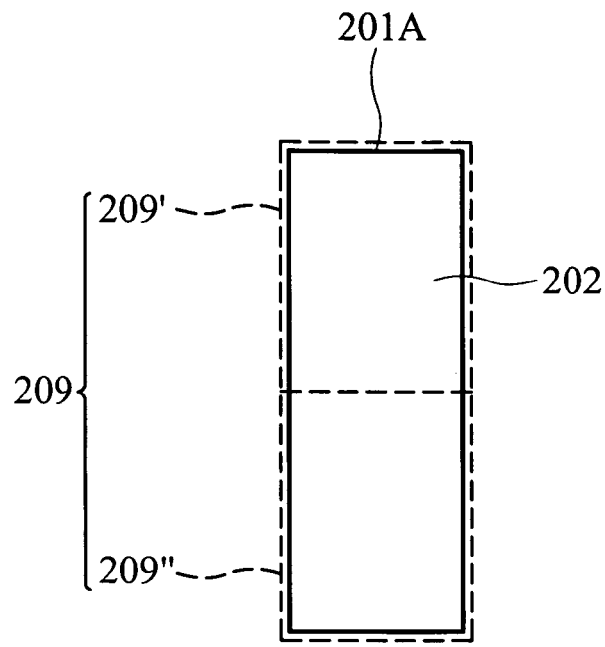
FIG. 6A is a top view of a dual-color auxiliary sub-pixel having a transmissive area of an embodiment of the invention.
Figure 6B:
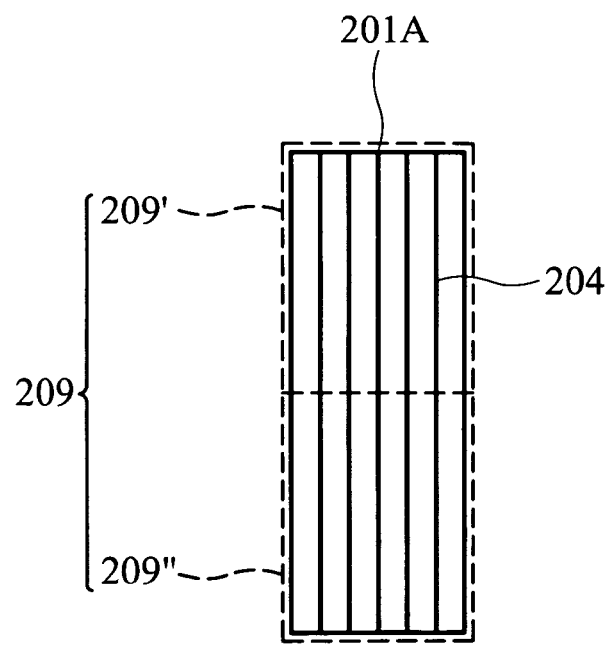
FIG. 6B is a top view of a dual-color auxiliary sub-pixel having a reflective area of an embodiment of the invention.

In the embodiment shown in FIG. 5, the dual-color auxiliary sub-pixel 201A comprises transflective area 206. The dual-color auxiliary sub-pixel 201A, however, may comprise only a transmissive or reflective area, as shown in FIGS. 6A and 6B. FIG. 6A illustrates a dual-color auxiliary sub-pixel having a transmissive area of an embodiment of the invention and FIG. 6B illustrates a dual-color auxiliary sub-pixel with a dual-color filter having a reflective area of an embodiment of the invention, in which the same reference numbers as FIG. 5 are used in FIGS. 6A and 6B. In FIG. 6A, the dual-color auxiliary sub-pixel 201A with a transmissive area 202 comprises a dual-color filter 209 with a white color portion 209' and a yellow or green color portion 209". Additionally, the dual-color filter 209 may comprises a plurality of white color portions 209' and a plurality of yellow or green color portions 209".

Moreover, in FIG. 6B, the dual-color auxiliary sub-pixel 201A with a reflective area 204 comprises a dual-color filter 209 with a white color portion 209' and a yellow or green color portion 209". Additionally, the dual-color filter 209 may comprise a plurality of white color portions 209' and a plurality of yellow or green color portions 209".

Figure 7:
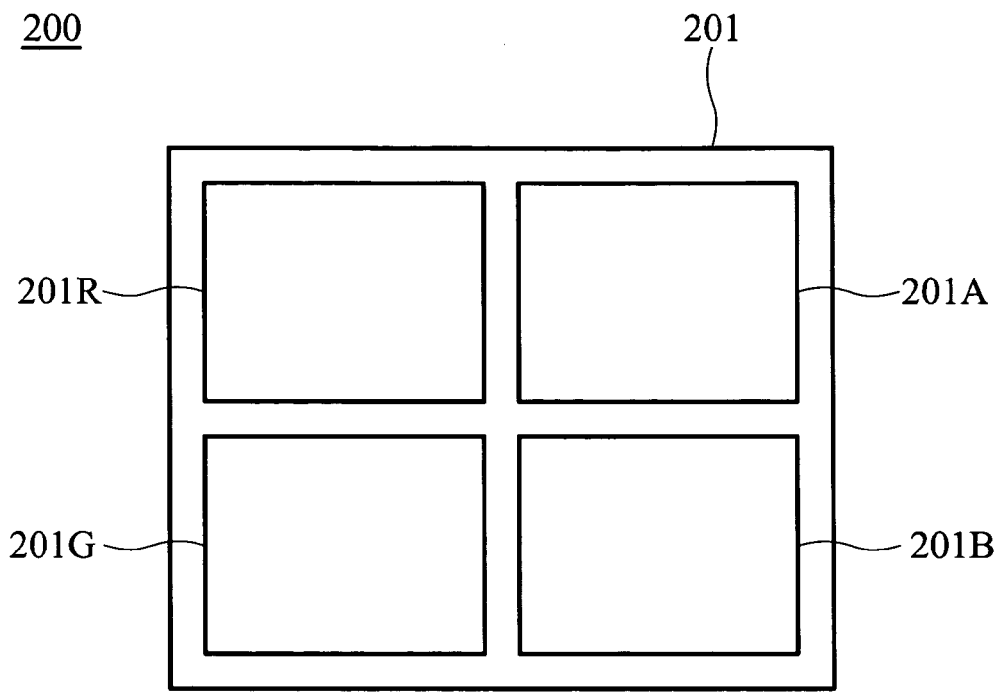
FIG. 7 is a top view of a pixel with a mosaic arrangement in a liquid crystal panel of an embodiment of the invention.

In embodiments of the invention, the sub-pixels 201R, 201G, 201B, and 201A of each pixel 201 in the liquid crystal panel 200 are arranged as a strip. However, those sub-pixels 201R, 201G, 201B, and 201A may be arranged in a mosaic, as shown in FIG. 7. Here, in order to simplify the diagram, each sub-pixel is depicted as a blank block.

Figure 8:
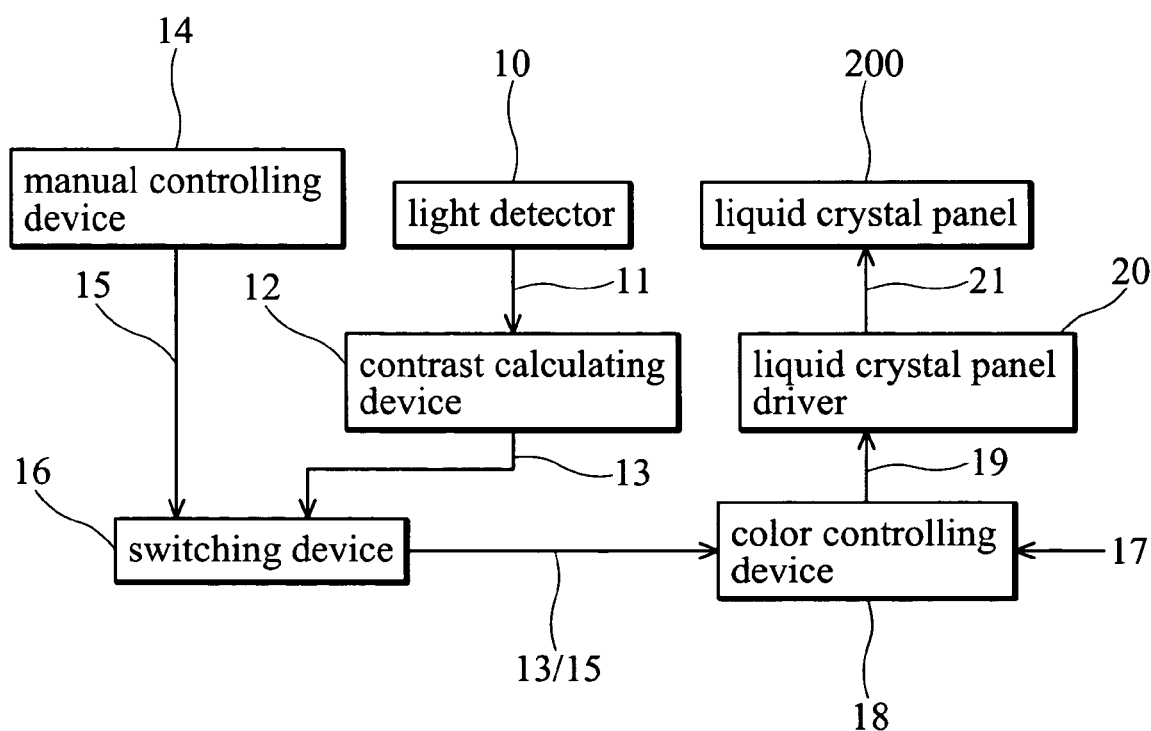
FIG. 8 is a block diagram of a liquid crystal display of an embodiment of the invention.

FIG. 8 illustrates a block diagram of a liquid crystal display of an embodiment of the invention. The liquid crystal display comprises a liquid crystal panel 200, a light detector 10, a contrast calculating device 12, a manual controlling device 14, a switching device 16, a color controlling device 18, and a liquid crystal panel driver 20. The liquid crystal panel 200 comprises a plurality of pixels 201 arranged in a matrix, as shown in FIG. 3. Each pixel 201 comprises a red sub-pixel 201R, a green sub-pixel 201B, a blue sub-pixel 201B, and an auxiliary sub-pixel 201A having a transflective area 206, as shown in FIGS. 4A, 4B, and 4C.

The auxiliary sub-pixel 201A comprises an auxiliary color filter 209 which may be a white color (achromatic or transparent) filter, a yellow color filter, a green color filter, or a dual-color filter (as shown in FIG. 5). For example, the dual-color filter may be a white/green or white/yellow color filter. Moreover, the auxiliary sub-pixel 201A with auxiliary dual-color filter 209 may comprise only a transmissive area 202 (as shown in FIG. 6A) or a reflective area 204 (as shown in FIG. 6B). The sub-pixels 201R, 201G, 201B, and 201A may be arranged in a strip (as shown in FIG. 4A, 4B, or 4C) or a mosaic (as shown in FIG. 7).

Since contrast of the liquid crystal panel 200 is lowered when ambient light is bright, the image cannot be easily or clearly discerned by the naked eye. Accordingly, in this embodiment, the light detector 10 detects brightness of ambient light and then outputs a detection signal 11. The contrast calculating device 12 receives the detection signal 11 and then transfers it into a brightness value. Thereafter, the contrast calculating device 12 calculates contrast of the liquid crystal panel 200 according to the brightness value and then outputs a first contrast adjusting signal 13. The color controlling device 18 transfers an input color image signal 17 according to the first contrast adjusting signal 13. The liquid crystal panel driver 20 receives the transferred color image signal 19 and outputs a driving signal 21 to drive the liquid crystal panel 200, thereby automatically adjusting the tilt angle of the liquid crystal molecules in the liquid crystal panel 200. Additionally, the switching device 16 can be optionally connected between the contrast calculating device 12 and the manual controlling device 14. The manual controlling device 14 is used for output of a second contrast adjusting signal 15. After the switching device 16 receives the first and second contrast adjusting signals 13 or 15, one of the signals 13 and 15 is selected by the switching device 16 and the selected signal is then output to the color controlling device 18, thereby transferring the color image signal 17. Note that the switching device 16 outputs the received first contrast adjusting signal 13 to the color controlling device 18 only if the switching device 16 does not receive the second contrast adjusting signal 15. Accordingly, in this embodiment, contrast of the liquid crystal panel can be automatically or manually adjusted. Moreover, contrast of the liquid crystal panel can be further adjusted by the pixel structure with four sub-pixels, thereby enhancing chromaticity and brightness.

While the invention has been described by way of example and in terms of the preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A liquid crystal panel, comprising:
   a plurality of pixels arranged in a matrix, each pixel comprising a red sub-pixel, a green sub-pixel, a blue sub-pixel, and an auxiliary sub-pixel;
   wherein the red, green and blue sub-pixels are used for one of transmissive and reflective modes and the auxiliary sub-pixel is used for a transflective mode.

2. The panel as claimed in claim 1, wherein the auxiliary sub-pixel further comprises a white, yellow, or green color filter.

3. The panel as claimed in claim 1, wherein the auxiliary sub-pixel further comprises a dual-color filter.

4. The panel as claimed in claim 3, wherein the dual-color filter is a white/green or white/yellow color filter.

5. The panel as claimed in claim 1, wherein the red, green, blue, and auxiliary sub-pixels are arranged in a strip or mosaic.

6. A liquid crystal display, comprising:
   a liquid crystal panel comprising:
      a plurality of pixels arranged in a matrix, each pixel comprising a red sub-pixel, a green sub-pixel, a blue sub-pixel, and an auxiliary sub-pixel, wherein the red, green and blue sub-pixels are used for one of transmissive and reflective modes and the auxiliary sub-pixel is used for a transflective mode;
   a light detector outputting a detection signal after detecting brightness of ambient light;
   a contrast calculating device calculating contrast of the liquid crystal panel according to the detection signal and outputting a first contrast adjusting signal;
   a color controlling device transferring a color image signal according to the first contrast adjusting signal; and
   a liquid crystal panel driver receiving the transferred color image signal and outputting a driving signal to drive the liquid crystal panel.

7. The display as claimed in claim 6, further comprising:
   a manual controlling device outputting a second contrast adjusting signal; and
   a switching device receiving the first and second contrast adjusting signals and outputting one of the signals to the color controlling device to transfer the color image signal.

8. The display as claimed in claim 6, wherein the auxiliary sub-pixel further comprises a white, yellow, or green color filter.

9. The display as claimed in claim 6, wherein the auxiliary sub-pixel further comprises a dual-color filter.

10. The display as claimed in claim 9, wherein the dual-color filter is a white/green or white/yellow color filter.

11. The display as claimed in claim 6, wherein the red, green, blue, and auxiliary sub-pixels are arranged in a strip or mosaic.

* * * * *